US007247373B2

(12) United States Patent
Akagi et al.

(10) Patent No.: US 7,247,373 B2
(45) Date of Patent: Jul. 24, 2007

(54) RACQUET STRING

(75) Inventors: Kazuhiro Akagi, Kato-gun (JP); Kenichi Umano, Kato-gun (JP); Yutaka Masuda, Kato-gun (JP)

(73) Assignee: Gosen Co., Ltd., Osaka (JP)

( * ) Notice: Subject to any disclaimer, the term of this patent is extended or adjusted under 35 U.S.C. 154(b) by 81 days.

(21) Appl. No.: 11/054,798

(22) Filed: Feb. 10, 2005

(65) Prior Publication Data

US 2005/0245333 A1 Nov. 3, 2005

(30) Foreign Application Priority Data

Mar. 10, 2004 (JP) ............................ 2004-067632

(51) Int. Cl.
*D02G 3/00* (2006.01)
*A63B 49/00* (2006.01)

(52) U.S. Cl. ...................... 428/372; 428/375; 428/394; 428/395; 473/537; 473/543

(58) Field of Classification Search ................ 977/734, 977/753, 783, 963; 473/537, 539, 540, 543
See application file for complete search history.

(56) References Cited

U.S. PATENT DOCUMENTS 5,776,608 A * 7/1998 Asher et al. ................ 428/373
6,528,572 B1 * 3/2003 Patel et al. ................. 524/495

FOREIGN PATENT DOCUMENTS

JP 9-10367 1/1997

* cited by examiner

*Primary Examiner*—Jill Gray
(74) *Attorney, Agent, or Firm*—Hamre, Schumann, Mueller & Larson, P.C.

(57) ABSTRACT

A racquet string includes a core component whose principal component is a synthetic fiber, and a surface resin component, wherein fullerenes or by-product carbon particles derived from manufacture of fullerenes are blended into the surface resin component, and wherein the blended percentage content is in a range of at least 0.01 wt % and at most 5.0 wt % of the entire string. The surface resin component may be formed as a sheath component by coating or by composite spinning. It is preferable that the amount of fullerenes or by-product carbon particles derived from the manufacture of fullerenes that is included in the surface resin component is in a range of at least 0.1 wt % and at most 25 wt %. Thus, the durability of the racquet string is improved without substantially changing its physical properties.

13 Claims, 2 Drawing Sheets

10
1
2
3

RACQUET STRING

FIELD OF THE INVENTION

The present invention relates to racquet strings that have superior durability and playability, for sports such as tennis, badminton and squash.

BACKGROUND OF THE INVENTION

Currently, strings made from synthetic fiber monofilaments and/or multifilaments such as polyamide are used widely as strings for racquets used in sports such as tennis, badminton, and squash. Although important characteristics required of these racquet strings are playability and durability, basically these have an inverse relationship and there is a demand for a racquet string that satisfies both characteristics. For example, although racquet strings constituted by polyamide-based synthetic fiber multifilaments have excellent playability compared to natural gut, their durability is inferior when compared with monofilament synthatex strings, and there is a demand for this to be improved.

In JP H9-10367A, the applicant of the present invention has suggested that when a resin coating layer is present on the surface of racquet strings, the durability of the strings can be improved by including aluminum boronate whiskers, for example, in the surface resin coating layer. This has the effect of improving the durability to a certain extent, but, in order to give a sufficient durability improvement effect, issues remain such as the need to blend in a relatively large amount since the shape of the whiskers is fibrous and the particles are relatively large. Furthermore, when the blending amount is large, problems such as filter blockage, which may occur during melt coating, tend to occur. There is also the problem of a reduction in playability when the blended amount is large.

As noted above, conventionally it has been difficult to find a balance between playability and durability, and furthermore, even in the method of adding whiskers to the coating layer to improve durability that was suggested in JP H9-10367A noted above, the reality at present is that a string that can adequately satisfy the durability improvement effect, strike feeling and processability has yet to be found.

SUMMARY OF THE INVENTION

In order to solve the above-noted conventional problem, it is an object of the present invention to provide a racquet string that has high durability.

The racquet string of the present invention comprises a core component whose principal component is a synthetic fiber, and a surface resin component, wherein fullerenes or by-product carbon particles derived from the manufacture of fullerenes are blended into the surface resin component, and wherein the blended percentage content is in a range of at least 0.01 wt % and at most 5.0 wt % of the entire string.

DETAILED DESCRIPTION OF THE INVENTION

Figure 1:
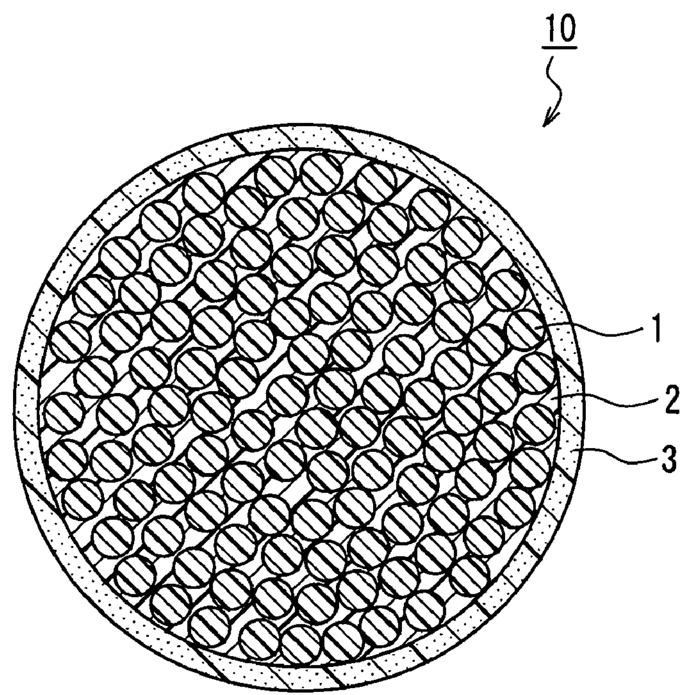
FIG. 1 is a cross-sectional view of a string according to Working Example 1 of the present invention.

For the racquet string of the present invention, by including fullerenes or by-product carbon particles derived from the manufacture of fullerenes in a surface resin, it is possible to improve the durability of the string without greatly changing its physical properties or strike feeling by adding a small amount.

The inventors of the present invention have found that carbon particles of a specific structure called fullerenes or by-product carbon particles derived from the manufacture of fullerenes, have a significant durability improving effect, and that they also satisfy feel, physical and processability properties, leading to the present invention. Below, "by-product carbon particles derived from the manufacture of fullerenes" is also referred to as by-product carbon particles from the time of manufacture of fullerenes. Furthermore, fullereness or by-product carbon particles derived from the manufacture of fullerenes are also referred to as "mixed fullerenes".

In the present invention, fullerenes or by-product carbon particles derived from the manufacture of fullerenes are blended into the surface resin component, and it is preferable that the blended percentage content is in a range of at least 0.01 wt % and at most 5.0 wt % of the entire string. Provided that the blended percentage component is in this range, it is possible to provide durability that is practically sufficient.

Furthermore, it is preferable that the surface resin, which includes fullerenes or by-product carbon particles from the time of manufacture of fullerenes, is formed by a method of coating. This is because coating methods are employed easily during the manufacture of the strings.

Furthermore, the surface resin, which includes fullerenes or by-product carbon particles from the time of manufacture of fullerenes, may be formed as a sheath component by composite spinning. Since the string itself is manufactured by melt spinning, this may be applied by using a composite spinning device during melt spinning.

Furthermore, it is preferable that the surface resin component is a polyamide-based resin or a polyurethane-based resin. This is because these have excellent mechanical properties such as strength and ductility.

Furthermore, it is preferable that the amount of fullerenes or by-product carbon particles derived from the manufacture of fullerenes that is included in the surface resin component is in a range of at least 0.1 wt % and at most 25 wt %. Provided that the blended percentage component is in this range, it is possible to provide durability that is practically sufficient.

Furthermore, it is preferable that the thickness of the surface resin layer is in a range of at least 10 μm and at most 300 μm.

In the present invention, "fullerene" means a carbon molecule constituted by five-member and six-member carbon rings, and containing a diverse, multi-faceted structure enclosed as a sphere-like structure, which is the third carbon allotrope along with graphite and diamond. A typical example of a fullerene molecule is C60, in which 60 carbon atoms constitute a spherical, truncated regular icosohedron made of 12 five-member rings and 20 six-member member rings. In a similar manner, C70 and also higher order fullerenes, for example, also exist. These fullerenes exhibit exceedingly specialized properties due to their structure, an example being that despite being a carbon allotrope, they are soluble in organic solvents such as benzene and toluene. Furthermore, significant characteristics are exhibited by the internal electrons due to the fullerene's highly symmetrical structure, and applications in materials such as superconductors and semiconductors, and optically functional material have been reported. Moreover, various closely related compounds may be obtained by enclosing metal atoms and performing chemical modifications such as hydration and halogenation.

Examples of methods of manufacturing fullerenes include various methods such laser vapor deposition, resistance heating and arc discharge, but in recent years, sintering is most widely used as an economic, highly efficient mass production method.

In the above-noted manufacturing method, fullerenes are obtained as a soluble component of soot, and are isolated by methods such as solvent extraction and sublimation. The thus obtained fullerenes are usually obtained as a mixture of C60, C70 and higher orders. C60 and C70 may be isolated by further refining.

In the present invention, it is possible to use fullerenes having any one of the structures noted above, but from the point of view of performance and cost, it is particularly preferable to use only C60, only C70, or mixed fullerenes containing at least 30 wt %, or more preferably at least 50 wt % C60.

Furthermore, fullerenes modified by chemical modulators, or by encapsulating metal, also may be used as modified fullerenes.

"By-product carbon particles from the time of manufacture of fullerenes" refers to particles obtained as the non-soluble component of the soot described above. Because these particles are created under the fullerenes manufacturing conditions, they differ from conventionally known graphite or carbon black, and are characterized in that graphite structures are substantially non-existent. More specifically, within the 3° to 30° diffraction angle range of results of X-ray diffraction using CuK $\alpha$ rays, the strongest peak was in the 10° to 18° diffraction angle range, and no peak was found at the 23° to 27° diffraction angle range that corresponds to the interfacial layers of the graphite structure, or it was exceedingly small. At the same time, a result of the Raman spectrum at an excitation wavelength of 514.5 nm, was that they are certain particles with peaks in band $G=1590\pm20\ cm^{-1}$ and in band $D=1340\pm40\ cm^{-1}$, and with a peak intensity ratio I(D)/I(G) of each band in a range of 0.4 to 1.0. This fact shows that the present carbon particles have a different structure from graphite. However, this means that they have a highly regular structure. It seems to mean that the likely structure is not a planar structure as seen in graphite, but most probably has a special internal structure that is a unit structure having, curves derived from five member carbon rings, similar to fullerene, and it seems that this contributes to the effect of the present invention.

For the surface resin component, polyamide-based resins such as, preferably, nylon-6, nylon-66, nylon-610 and nylon-12 or polymers of these, or polyurethane-based resins are preferably used. These resins are usually melt coated, but it is also possible to coat by what is known as resin processing, using solutions or dispersion liquids.

Furthermore, it is also possible to obtain a coating by blending fullerenes into the sheath component in composite spinning. In this case, the surface resin is also aligned, so strength is high, and although a gut that contains fullerenes in the surface resin is obtained substantially only in the spinning process, monofilament types such as core-sheath types and sea-island types are preferable.

If the racquet string of the present invention includes fullerenes in the surface resin layer, then the constituent fiber material and the structure is not limited, but satisfies its performance and physical properties as a string. In order to express sufficiently the effect of the present invention, the following are examples of favorable fiber materials and structures.

Examples of a favorable fiber material of the core component, which takes the composite fiber of the present invention to be its principal component, are polyamide-based resins such as, nylon-6, nylon-66, nylon-610 and nylon-12, or polymers of these. Alternatively, examples of a favorable fiber material include aromatic polyester-based fibers such as polyethylene terephthalate, polytrimethylene terephthalate and polybutylene terephthalate, fatty series polyester fibers such as polylactic acid, which is known as a biodegradable material, and polyolefin-based fibers. More preferable is a case in which the principal component is a polyamide-based fiber.

In the present invention, in the principal component of the core component, which is a synthetic fiber, the "principal component" means at least 80 wt % and at most 100 wt %.

There is no particular limitation to the structure of the racquet string, and any conventionally known structure and configuration may be used. The construction can be divided into monofilament-types, multifilament types, and types that combine both monofilaments and multifilaments. However the multifilament type, or the combination monofilament and multifilament type, which have the problem with durability, preferably are used because the effect of the present invention is significant, and its practical value is high. It should be noted that here, "monofilament" refers to a thread whose single filament thickness is at least about 0.05 mm (20 dtex), and "multifilament" refers to a thread in which a multitude of single filaments, having a single filament thickness of less than 20 dtex, are bundled together.

There is no particular limitation with regard to the manufacturing method, and any manufacturing method known in the art may be used. That is to say, in addition to using single monofilaments individually, processing methods such as twisting, winding adhesion, braiding, and resin impregnation also may be used.

The fullerenes and by-product carbon particles from the time of manufacture of fullerenes that are used in the present invention have a high durability improving effect at a low blending percentage, and the particles have superior dispersion characteristics even if blended into the resin. Furthermore, the particles also have been found to have the advantage of a higher durability improving effect than carbon black.

There is no particular limitation to the method of blending the particles into the coating resin, but in the case of melt coating or composite spinning, it is possible to use a method of blending the particles with resin chips during coating or spinning, or preparing high concentration master chips in advance, and blending them with regular chips. Furthermore, if the resin is processed using a resin solution or dispersion liquid, then it is possible to use the fullerenes dispersed or dissolved in the process liquid. If dispersing the particles to use them, then a dispersing agent may be used where necessary.

For the blending percentage of the surface resin, it is preferable to use an amount that is in a range of at least 0.1 wt % and at most 25 wt %. When less than 0.1 wt %, substantially no durability improvement effect is observed, and when the blended amount is greater than 25 wt %, the film strength of the resin is reduced, and processability also is affected adversely. It is preferable that the thickness of the surface resin is at least 10 μm, and at most 300 μm. At less than 10 μm, the effect is barely observed, and at greater than 300 μm, in the coating process, the amount of the central fiber portion is reduced, and thus strength is reduced and durability is lowered.

The present invention does not prevent blending of fullerenes or by-product carbon particles from the time of manufacture of the fullerenes into fibers or adhesives that constitute the string which are other than the surface resin, but blending into the surface coating resin is favorable because it is efficient and effective, and because there is substantially no decrease in physical properties. It is preferable that the blended percentage content of fullerenes is in a range of at least 0.01 wt % and at most 5.0 wt % of the entire string.

The racquet string of the present invention may be used in any racquet sport such as tennis, softball tennis, badminton, squash and racquetball.

EMBODIMENTS

Embodiments of the present invention are described more specifically below.

Working Example 1

1224 single nylon-6 multifilaments having a single filament denier of 6 dtex and having 80 turns/m were impregnated with a UV hardening resin whose principal component is a urethane acrylic-based monomer, passed through a nozzle having a diameter of 1.1 mm, and squeezed. After this a high pressure mercury vapor lamp was used to emit UV radiation to harden the filament to obtain a linear body having a diameter of 1.14 mm.

Using a nylon resin (having a blended fullerenes content of 1 wt %), being a blend of 1 weight part mixed fullerenes to 99 weight parts nylon pellets, manufactured by Frontier Carbon Corporation, a racquet string was obtained by regular melt coating onto the circumference of the linear body. The fullerenes content was 0.21% with respect to the entire string.

The thus obtained racquet string had a deep brown color, and had a diameter of 1.32 mm, tensile strength of 77.7 kg, a knot strength of 37.1 kg and an elongation of 25.3%.

A cross-sectional view of this string is shown in FIG. 1. In FIG. 1, numeral 1 denotes the nylon-6 multifilament, numeral 2 denotes the UV hardened resin, numeral 3 denotes the nylon resin that includes fullerenes, and numeral 10 denotes the string.

This string was threaded onto a tennis racquet, and both vertical and horizontal strings strung to a tension of 60 lbs. Tensional characteristics were excellent.

In order to evaluate the durability, this racquet was used to hit actual tennis balls continuously at a speed of 100 km/h, at a frequency of 15 times/minute over a hitting distance of 50 cm, until the string broke. The number of hits, up until the string broke averaged 1,090 over a total of two tests.

Comparative Example 1

As Comparative Example 1, a string obtained by a method in which the conditions were exactly the same as Working Example 1, except that fullerenes were not included, was tested for durability in a similar manner. The result was 850 times.

Working Example 2

A nylon-6 monofilament having a diameter of 0.78 mm as the core filament, and 13 nylon-6 monofilaments having a diameter of 0.235 mm as the side filaments, were wound and bonded to obtain a thread-shaped body having a diameter of 1.25 mm. This was then coated with a nylon-6 resin, which was dosed with 0.8% mixed fullerenes. The fullerenes content of the string was 0.15%. The diameter of the racquet string thus obtained was 1.30 mm, having a tensional strength of 82.3 kg, a knot strength of 42.6 kg and an elongation of 29.0%.

Figure 2:
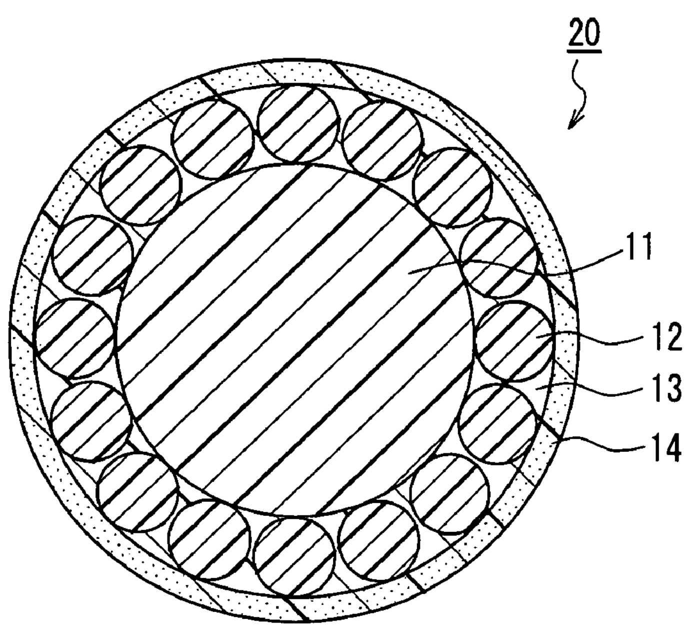
FIG. 2 is a cross-sectional view of a string according to Working Example 1 and Working Example 2 of the present invention.

A cross-sectional view of this string is shown in FIG. 2. In FIG. 2, numeral 11 denotes the nylon-6 monofilament as the core filament, numeral 12 denotes the nylon-6 monofilament as the side filament, numeral 13 denotes a UV hardened resin, numeral 14 denotes the nylon resin containing fullerenes, and numeral 20 denotes the string.

The durability of this string was investigated by the same method as used in Working Example 1. For a total of two tests, the average number of hits obtained before the string broke is shown in Table 1.

Working Example 3

A nylon-6 monofilament having a diameter of 0.78 mm as the core filament, and 13 nylon-6 monofilaments having a diameter of 0.235 mm as the side filaments were wound and bonded to obtain a thread-shaped body having a diameter of 1.25 mm. This was then coated with a nylon-6 resin that was dosed with 0.8% by-product carbon particles from the time of manufacture of fullerenes (Nanome Black FB-S, manufactured by Frontier Carbon Corporation).

The racquet string thus obtained was black, having a diameter of 1.30 mm, a tensile strength of 81.9 kg, a knot strength of 43.2 kg and an elongation of 29.4%.

A cross-sectional view of this string is shown in FIG. 2. In FIG. 2, numeral 11 denotes the nylon-6 monofilament, numeral 12 denotes the nylon-6 monofilament as the side filament, numeral 13 denotes a UV hardened resin, numeral 14 denotes the nylon resin containing fullerenes, and numeral 20 denotes the string.

The durability of this string was investigated in a similar manner to that of Working Example 1. For a total of two tests, the average number of hits obtained before the string broke is shown in Table 1.

Comparative Examples 2 to 4

For comparison, Table 1 shows the durability of a ease in which the mixed fullerenes in Working Example 2 were not added (Comparative Example 2), a case in which a similar amount of carbon black was added (Comparative Example 3), and similarly, a case in which aluminum borate whiskers (average fiber length 20 μm, average fiber diameter 0.8 μm), surface treated with the same weight % of a silane coupling agent, were added (Comparative Example 4).

TABLE 1

| | Durability (hits) |
|---|---|
| Working Example 2 | 1510 |
| Working Example 3 | 1532 |
| Comparative Example 2 | 994 |
| Comparative Example 3 | 1120 |
| Comparative Example 4 | 1079 |

As described above, and is made clear in the comparison between Working Example 1 and Comparative Example 1, and Working Examples 2 and 3 and Comparative Examples 2 to 4, it can be confirmed that the durability of the working examples of the present invention is higher.

Working Example 4

As the core thread, using a thread in which nylon-6 multifilament (204 filaments having a denier of 2100 dtex) is spun to 200 turns/m, after which it is resin processed in a nylon co-polymer emulsion, and three nylon-6 monofilaments (diameter 0.06 mm) as the outer thread, a string was braided on a 16 spool braiding machine. The braided thread had a diameter of 0.73 mm, a strength of 25.7 kg and an extension of 26.2%.

To perform resin processing, this thread was dipped into a solution in which a nylon co-polymer is dissolved in methanol, then squeezed out. After this, melt coating was carried out using nylon-6 resin blended with 0.5 wt % fullerenes (Mixed Fullerenes manufactured by Frontier Carbon Corporation). After this, a silicone-based oil agent was applied to obtain a badminton string (gut).

The diameter of the string was 0.76 mm, having a strength of 25.2 kg and an elongation of 26.0%.

Figure 3:
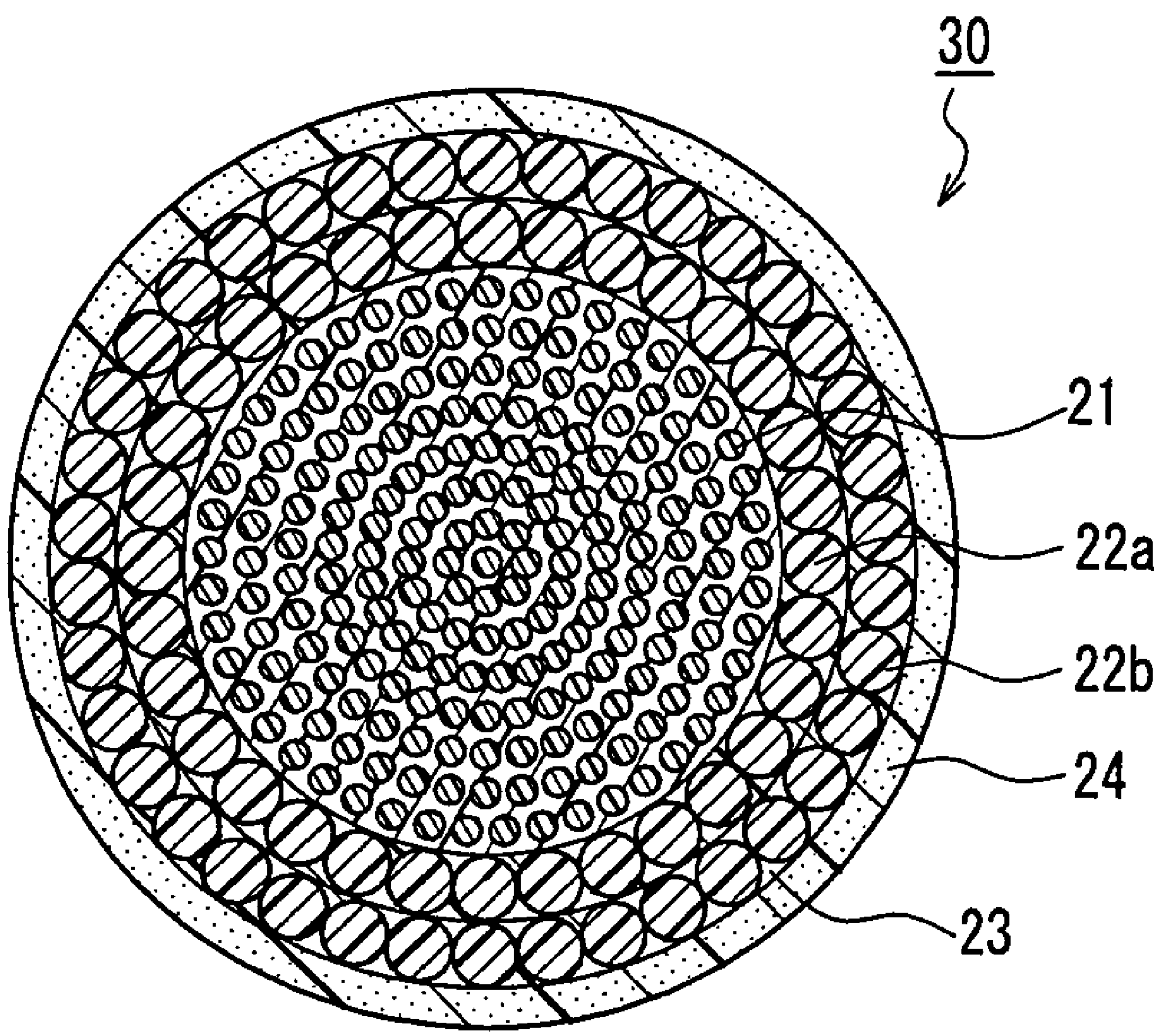
FIG. 3 is a cross-sectional view of a string according to Working Example 4 of the present invention.

A cross-sectional view of this string is shown in FIG. 3. In FIG. 3, numeral 21 denotes the nylon-6 multifilament, numerals 22*a* and 22*b* denote the nylon-6 monofilaments, numeral 23 denotes a UV hardened resin, numeral 24 denotes the nylon resin that contains the fullerenes, and numeral 30 denotes the string.

This string was strung onto a badminton racket at a tension of 25 lbs (11.34 kg). As a comparison, it then underwent a comparative hitting test with a string manufactured in a similar manner, apart from the inclusion of fullerenes.

The comparative gut had a diameter of 0.76 mm, a strength of 25.3 kg and an extension of 26.6%, thus showing no substantial difference in the material properties of strength and elongation. However, from the results of the hitting test, the durability of the string of the present working example was approximately 30% greater than that of the comparative example.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A racquet string comprising;

a core component whose principal component is a synthetic fiber, and a surface resin component disposed over the core component;

the surface resin component of the racquet string including fullerenes or by-product carbon particles derived from manufacture of fullerenes that are blended into the surface resin component of the racquet string, wherein the blended percentage content is in a range of at least 0.01 wt % and at most 5.0 wt % of the entire racquet string.

2. The racquet string according to claim 1, wherein the surface resin is applied by a coating method.

3. The racquet string according to claim 1, wherein the surface resin component is a sheath component formed by composite spinning.

4. The racquet string according to claim 1, wherein the surface resin component is a polyamide resin or a polyurethane resin.

5. The racquet string according to claim 1, wherein the amount of fullerenes or by-product carbon particles derived from the manufacture of fullerenes that is included in the surface resin component is in a range of at least 0.1 wt % and at most 25 wt %.

6. The racquet string according to claim 1, wherein a thickness of the surface resin component is in a range of at least 10 μm and at most 300 μm.

7. The racquet string according to claim 1, wherein the fiber of the core component is at least one synthetic fiber selected from a polyamide fiber, an aromatic polyester fiber, a fatty series polyester fiber and a polyolefin fiber.

8. The racquet string according to claim 1, wherein the fiber of the core component is a monofilament, a multifilament or a combination of a monofilament and a multifilament.

9. The racquet string according to claim 8, wherein the fiber of the core is a monofilament that has a single filament thickness of at least 20 dtex.

10. The racquet string according to claim 8, wherein the fiber of the core is a multifilament that is a thread in which a multitude of single filaments, having a single filament thickness of less than 20 dtex, are bundled together.

11. The racquet swing according to claim 1, wherein the by-product carbon particles derived from manufacture of fullerenes does not contain graphite or carbon black.

12. The racquet string according to claim 1, wherein the by-product carbon particles derived from manufacture of fullerenes include a non-planar structure.

13. The racquet string according to claim 1, wherein the by-product carbon particles derived from manufacture of fullerenes are particles obtained as a non-soluble component resulting from the manufacture of fullerenes.

* * * * *